Feb. 2, 1960  J. A. WOODS  2,923,099
METHOD OF FABRICATING MULTIPLE GLASS SHEET GLAZING UNITS
Filed Sept. 10, 1953  3 Sheets-Sheet 1
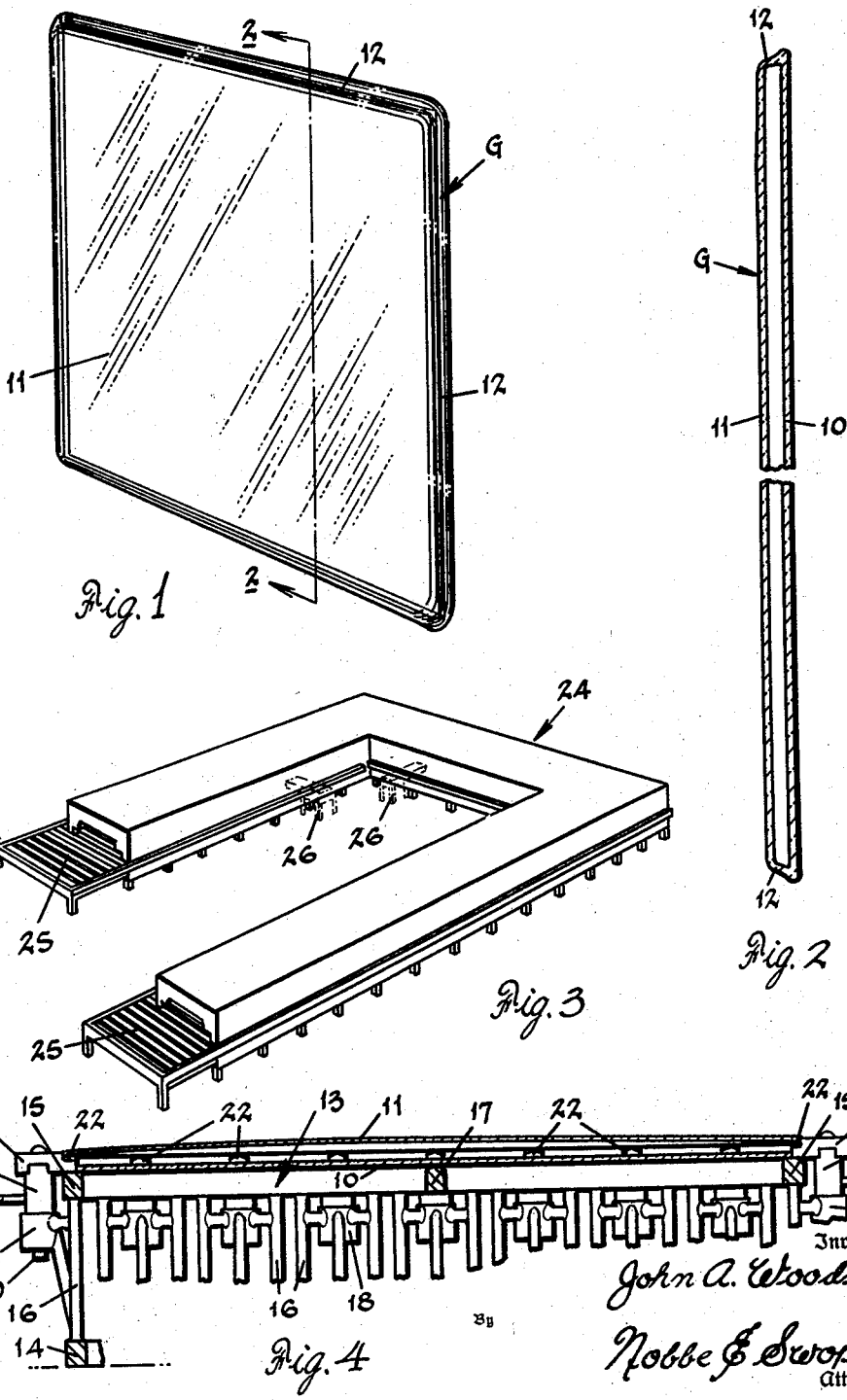
Inventor
John A. Woods
By
Nobbe & Swope
Attorneys Feb. 2, 1960 J. A. WOODS 2,923,099
METHOD OF FABRICATING MULTIPLE GLASS SHEET GLAZING UNITS
Filed Sept. 10, 1953 3 Sheets-Sheet 2

Inventor
John A. Woods
By Nobbe & Swope
Attorneys

Feb. 2, 1960

J. A. WOODS 2,923,099

METHOD OF FABRICATING MULTIPLE GLASS SHEET GLAZING UNITS

Filed Sept. 10, 1953

Inventor
John A. Woods
By
Nobbe & Swope
Attorneys

United States Patent Office 2,923,099
Patented Feb. 2, 1960

2,923,099

METHOD OF FABRICATING MULTIPLE GLASS SHEET GLAZING UNITS

John A. Woods, Toledo, Ohio, assignor to Libbey-Owens-Ford Glass Company, Toledo, Ohio, a corporation of Ohio Application September 10, 1953, Serial No. 379,384

1 Claim. (Cl. 49—82)

This invention relates broadly to the production of multiple sheet glass glazing units and more particularly to an improved method and apparatus for fabricating an all-glass multiple sheet glazing unit.

Multiple glazing units may be described generally as comprising two or more sheets of glass which are sealed entirely around their marginal edge portions in spaced relation to one another to provide a hermetically sealed air space therebetween. More particularly, the type of unit disclosed in the above copending application comprises two sheets of glass arranged in spaced face-to-face relation and having their marginal edge portions sealed or fused directly to one another to provide an all-glass glazing unit.

In fabricating such a unit, the two sheets of glass are supported in a horizontal position and in spaced apart relation, upon a so-called tray which carries the sheets through a furnace in which they are subjected to sufficient heat to cause the edge portions of the sheets to be fused together to form a unitary structure. During such fusing operation, the temperature in the furnace often reaches the softening point of the glass. Consequently, it has been found that the upper glass sheet, which is supported only at its edges, has a tendency to bend or sag downwardly towards the lower glass sheet which is rigidly supported. This bending or sagging of the upper sheet with respect to the lower sheet impairs the optical properties of the finished unit. Also, the structural strength of the unit has been found to be impaired because the inward distortion of the upper sheet allows a smaller force placed on the edge of the unit to cause the sheet to buckle and break.

It is therefore the aim of this invention to avoid this distortion or bending of the upper glass sheet during the fusing of the glass sheets together.

Another object of the invention is to provide a method and apparatus which may be used to prebend the upper glass sheet of the multiple glazing unit to compensate for the distortion caused in the subsequent fusing operation.

Another object of the invention is to provide a method and apparatus for prebending several glass sheets in a single prebending operation and thus save the time and expense of bending each sheet individually.

A further object of the invention is the provision of a method for assembling the prebent glass sheet with a second flat sheet of glass and in fusing them together.

Other objects and advantages of the invention will become more apparent during the course of the following description when taken in connection with the accompanying drawings.

In the accompanying drawings, wherein like numerals are employed to designate like parts throughout the same:

Fig. 1 is a perspective view of an all-glass multiple sheet glazing unit of the type with which the present invention is concerned;

Fig. 2 is a cross sectional view taken on line 2—2 of Fig. 1;

Fig. 3 is a perspective view of one type of furnace which may be used in fabricating the multiple sheet glazing units;

Fig. 4 is a horizontal sectional view of a sealing tray with two glass sheets in position to be sealed, the upper glass sheet having been prebent in accordance with the invention;

Figure 5:
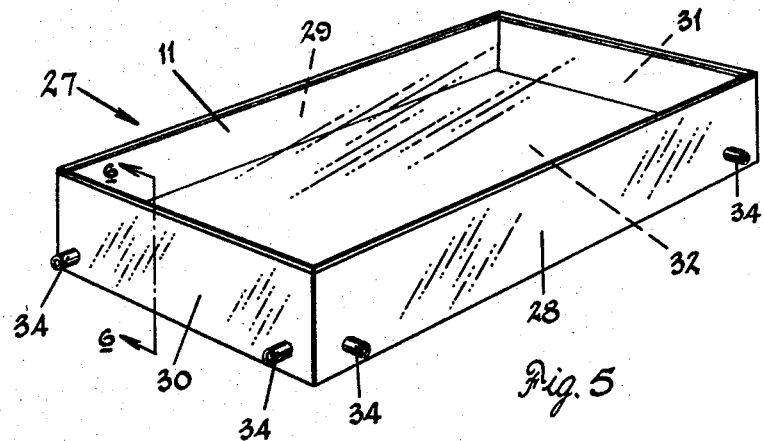
Fig. 5 is a perspective view of one form of tray or frame used to support the glass sheet during prebending.

Referring first to Figs. 1 and 2, the letter G generally denotes an all-glass, multiple glazing unit of the type to which this invention appertains. The glazing unit G is composed of two sheets of glass 10 and 11 arranged in spaced face-to-face relation with respect to one another and having their marginal edge positions sealed or fused together as indicated at 12 to provide a hermetically sealed unit.

As will be apparent from Fig. 2, it is essential that the two sheets of glass 10 and 11 be parallel with respect to one another if the best optical and strength qualities of the unit are to be attained. However, as mentioned above, it has heretofore been difficult to maintain the glass sheets in spaced parallel relationship during the sealing or fusing of the edge portions thereof and it is the aim of the present invention to overcome this difficulty.

As described in the aforementioned copending application, when fusing the edges of the glass sheets together, the said sheets are initially supported one above the other in a horizontal position on a tray 13 such as shown in Fig. 4. The shape of the tray corresponds to the outline of the glass sheets supported thereby, but for purposes of illustration the sheets are shown as being rectangular. In particular, the tray comprises a lower rim or base 14 and an upper rim 15 which are connected together by a series of vertical struts 16. The contour of the upper rim 15 conforms to that of the lower glass sheet 10, the marginal edge portions of which are supported on the upper edge of said rim. Additional support may be provided for the central portion of the said sheet by a rib 17 extending between opposite ends of the upper rim 15 and preferably having a rounded upper edge in horizontal alignment with the upper edge of said rim.

Positioned adjacent the upper rim 15 of the tray and secured between the struts 16 are a plurality of bearings 18 having vertical pins 19 journaled therein, said pins having headed portions 20 upon which are carried the upper sheet supporting arms 21 for supporting the upper glass sheet 11 as shown in Fig. 4.

Each of said arms 21 is notched at its inner end as at 22 to form a ledge on which the marginal edge portions of the upper sheet 11 are supported in predetermined spaced relation to the lower sheet 10. Attached to the headed portions 20 below the sheet supporting arms 21 are handles 23 which are actuated to swing the arms 21 into and out of sheet supporting position.

When using the tray 13, the sheet supporting arms 21 are swung upon the pins 19 out of sheet supporting position while a lower glass sheet 10 is placed upon the upper rim 15, after which the arms are swung into supporting position and a top sheet of glass 11 placed thereon as described above.

The tray 13, with the glass sheets 10 and 11 supported thereon, is then introduced into and conveyed through a heating furnace 24 wherein the marginal edge portions of the glass sheets are fused together to form a hermetically sealed unit as shown in Figs. 1 and 2. The tray may be carried through the furnace upon a conveyor means 25 and the fusing or sealing of the glass sheets may be effected by burners 26 which heat the edges of the glass sheets as they move past said burners and cause a fusing action between the two edges to occur. As the glass sheets are conveyed past the burners, the handles 23 are progressively actuated to swing the arms 21 horizontally out of sheet supporting position so that the edge portions of the two sheets can fuse together.

During the heating and fusing of the edges of the glass sheets, it has been found that the heat built up in the furnace causes the upper glass sheet 10 to be heated to such a degree that the central unsupported area thereof has a tendency to sag or bend downwardly and which condition has been found to be objectionable in the finished glazing unit for the reasons set forth above.

To alleviate this condition, I have found that the upper glass sheet 10 may be prebent or initially distorted before it is assembled with the lower glass sheet on the fusing tray 13 and thus compensate for the bending which takes place during fusing of the sheet edges.

Figure 6:
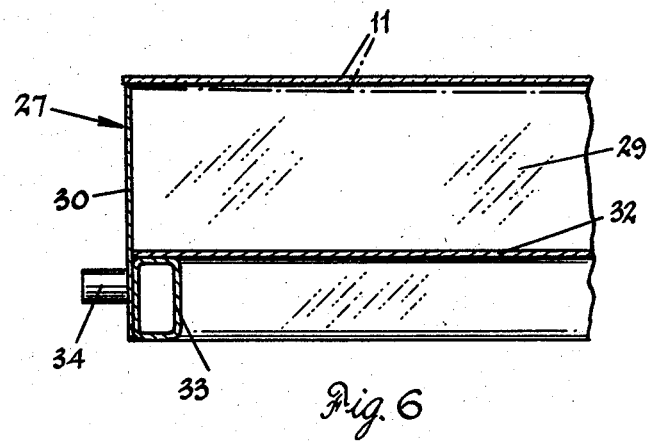
Fig. 6 is a partial cross sectional view of the tray taken on line 6—6 of Fig. 5.

It is preferred that this prebending be performed on a special type of frame and one embodiment of such a frame is illustrated in Figs. 5 and 6. As therein shown, the frame 27 is rectangular and composed of side walls 28 and 29 and end walls 30 and 31, which form an enclosure of the same size and shape as the glass sheet to be prebent thereon. The frame is provided with a heat insulating bottom 32 which is supported upon ledge members 33 which may be suitably secured, as by riveting or welding, to the side and end walls of the frame. The bottom 32 protects the glass sheet from the direct action of the fusing burners 26 and aids in more uniform heating of the sheet. Attached to the side and end walls of the frame are spacer bumpers 34 which space the frames from each other as they are being conveyed through the furnace so as to prevent the frames from abutting directly against each other and dislodging the sheets from their fixed positions thereon.

In practice, a sheet of glass is placed upon the frame 27 and is supported only at its extreme marginal edges upon the upper edges of the side and end walls. The frame, together with the sheet thereon, is then placed on traveling conveyor 25 and carried through furnace 24 shown in Fig. 4.

The temperatures within the furnace are maintained slightly above the softening point of the glass sheet by the burners 26, and the speed of travel of the sheet is such that the sheet will remain in the furnace a predetermined length of time until the heat, in conjunction with the unsupported weight of the sheet, causes the sheet to bend downwardly and thus assume a concavo-convex or dish-like form as indicated in broken lines in Fig. 6. The glass sheet is then cooled as it continues through the furnace to permanently set the distortion or bend. Thereupon, the sheet is removed from the frame, inverted with the convex surface facing upwardly, and placed over the lower flat sheet of glass 10 on the sealing tray 13 as in Fig. 4. The tray is then placed on the conveyor 25 and passed through the furnace. As the tray moves past the burners, the heat therefrom acts to fuse the edges of the two sheets together.

It will be noted that when the two sheets of glass are carried in spaced apart relation upon tray 13, past the sealing burners 26, the upper sheet begins its travel in an upwardly convex position. However, during the fusing operation, the temperature of the central portion of the prebent glass sheet 11 again reaches the softening point of the glass and the sheet begins to sag. Since the top sheet has been placed so that its convex surface faces upwardly, the sag that now takes place compensates for the initial distortion and causes the sheet to return to a flat condition in parallel relation to the lower sheet 10.

Figure 7:
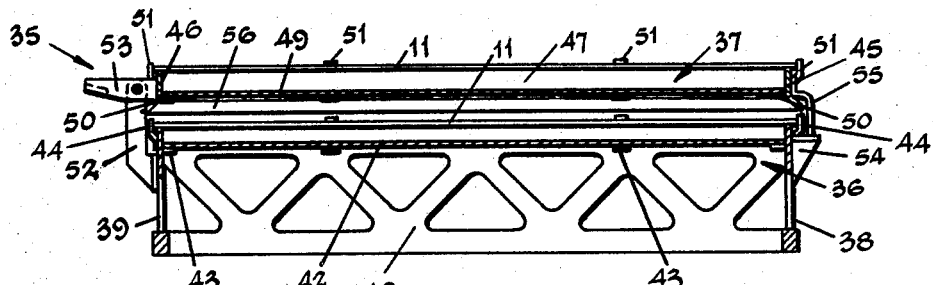
Fig. 7 is an alternate embodiment of the invention showing a multiple sheet prebending frame or tray.
Figure 8:
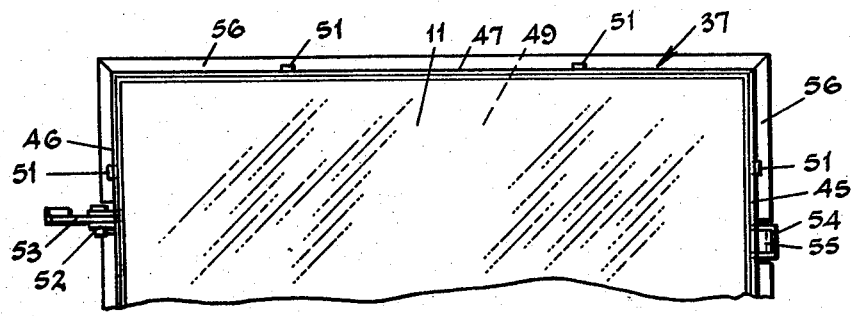
Fig. 8 is a partial plan view of Fig. 7.
Figure 9:
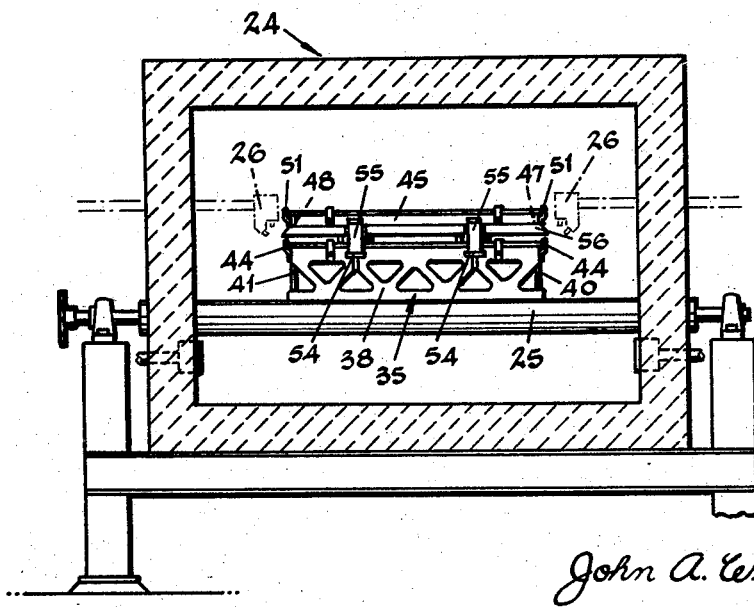
Fig. 9 is a cross sectional view of the furnace with a multiple sheet prebending frame therein.

Another embodiment of the invention showing a prebending frame or tray 35 for prebending two sheets of glass at the same time is illustrated in Figs. 7, 8 and 9. This tray 35 comprises a lower frame 36 and an upper frame 37. The lower frame has side walls 38 and 39 and end walls 40 and 41 and an insulating bottom wall 42 mounted upon horizontal ledges 43 carried by said side and end walls. A glass sheet 11 to be prebent is supported along its marginal edge portions upon the upper edges of the side and end walls of the lower frame and is held in position by upstanding fingers 44 also carried by said side and end walls.

The upper frame 37 also comprises side walls 45 and 46 and end walls 47 and 48, with a bottom wall 49 supported upon horizontal ledges 50 carried by said side and end walls. A second sheet of glass 11 is supported upon the upper edges of the side and end walls of the frame and are held in place by fingers 51 engaging the edges of said sheet.

Carried by one side wall of the lower frame is a bracket arm 52 to the upper end of which is pivoted a horizontal lever 53 fixed at its inner end to the upper frame 37. The opposite side wall of the lower frame carries a ledge 54 and to the upper frame is secured a leg 55 engageable with the ledge 54 to maintain the upper and lower frames in predetermined spaced parallel relation.

As will be noted in Fig. 9, the sealing burners 26 are located just above the lower glass sheet 11 and unless some means is provided for protecting the sheet it would receive the direct flames from the burners which would focus directly on the sheet and cause a localized distortion thereof to occur. In order to avoid this difficulty, there is carried by the side and end walls of the upper frame the downwardly and outwardly flared members 56 which constitute a shield for protecting the lower sheet from the direct action of the burners 26.

In operation, the multiple sheet prebending frame is used in the same manner as set forth above for the operation of the single frame 27. First, a plurality of sheets are supported at their marginal edges upon the individual frames 36 and 37 of the multiple frame 35. The sheets are then carried through the furnace 24 and are heated to their softening point to produce a predetermined amount of sag or bend therein, after which, the sheets are allowed to cool. Having had the required amount of distortion placed therein, the sheets are then removed from the frame 35, reversed and mounted upon trays 13 above glass sheets 10 as shown in Fig. 4 preliminary to being fused together as described above.

While it is to be understood that the forms of the invention disclosed herein are to be taken as the preferred embodiments thereof, various changes in the shape, size and arrangement of parts may be resorted to without departing from the spirit of the invention or the scope of the following claim.

I claim:

The method of producing a multiple glass sheet glazing unit, which comprises bending a flat sheet of glass so that it has a concave surface and a convex surface, positioning the prebent sheet in spaced face-to-face relation with a second flat sheet of glass, with the concave surface of said first sheet facing said second sheet, and then heating the two sheets of glass to fuse the edge portions thereof together to form a unitary structure, while simultaneously heating said structure until the prebent sheet returns to its original flat condition.

References Cited in the file of this patent

UNITED STATES PATENTS

| | | | |
|---|---|---|---|
| 514,495 | Pilkington | Feb. 13, 1894 |
| 1,448,351 | Kirlin | Mar. 13, 1923 |
| 1,793,039 | Yetter | Feb. 17, 1931 |
| 1,889,881 | Thompson | Dec. 6, 1932 |
| 2,131,873 | Goodwillie | Oct. 4, 1938 |
| 2,169,404 | Buttner | Aug. 15, 1939 |
| 2,191,952 | Blau | Feb. 27, 1940 |
| 2,327,883 | Galey | Aug. 24, 1943 |
| 2,385,071 | Geier | Sept. 18, 1945 |
| 2,389,360 | Guyer et al. | Nov. 20, 1945 |
| 2,450,297 | Pearse et al. | Sept. 28, 1948 |
| 2,550,252 | Jendrisak | Apr. 24, 1951 |
| 2,565,061 | Berdnarz | Aug. 21, 1951 |
| 2,624,978 | Hohmann | Jan. 13, 1953 |
| 2,624,979 | Clever et al. | Jan. 13, 1953 |
| 2,639,555 | Buttino et al. | May 26, 1953 |